United States Patent [19]
McInturff et al.

[11] 3,743,986
[45] July 3, 1973

[54] IMPROVED RESISTIVE ENVELOPE FOR A MULTIFILAMENT SUPERCONDUCTOR WIRE

[75] Inventors: Alfred D. McInturff, Bellport; Frank J. Abbatiello, Port Jefferson Station, both of N.Y.

[73] Assignee: The United States of America as represented by the United States Atomic Energy Commission, Washington, D.C.

[22] Filed: Feb. 8, 1972

[21] Appl. No.: 224,465

[52] U.S. Cl. .............................. 335/216, 174/DIG. 6
[51] Int. Cl. ............................................... H01f 7/22
[58] Field of Search .................. 335/216; 174/DIG. 6

[56] References Cited
UNITED STATES PATENTS
3,428,925  2/1969  Bogner et al. ................. 174/DIG. 6
3,638,154  1/1972  Sampson et al. ................ 174/DIG. 6
3,652,967  3/1972  Tanaka et al. ........................ 335/216

*Primary Examiner*—George Harris
*Attorney*—Roland A. Anderson

[57] ABSTRACT

Improved method for making superconductors and/or improving their superconducting characteristics in which an insulating or resistive envelope forming a sheath having a resistance higher than the superconductors is formed around a multifilamentary matrix stabilized superconductor wire. In one example, a tin-bronze layer is formed around multi-filamentary, matrix stabilized superconductor wires, and the tin-bronze layer is converted, at least in part, into an insulator. Also, an indium-thalium heat sink is provided. Additionally, multifilamentary superconductor wires are provided having a copper matrix into which titanium is diffused to leave a more resistive matrix around the Nb-Ti filaments.

7 Claims, 10 Drawing Figures

Patented July 3, 1973

Patented July 3, 1973 3,743,986

IMPROVED RESISTIVE ENVELOPE FOR A MULTIFILAMENT SUPERCONDUCTOR WIRE

BACKGROUND OF THE INVENTION

This invention was made in the course of, or under a contract with the United States Atomic Energy Commission.

In the field of superconductors, it is advantageous to provide a multifilamentary superconductor wire having many superconductor filaments in a resistive metal matrix, such as copper or copper bearing matrix, although an aluminum matrix may alternately be employed, as described in U.S. Pat. No. 3,432,783. One such multifilamentary superconductor wire is described in U.S. Pat. No. 3,638,154. However, the filaments of these superconductor wires have been difficult or expensive to fabricate. Mechanical strength and motion stability in strong pulsed magnetic fields have also been required. It has additionally been advantageous to provide multifilamentary superconductor wires with cryogenic, adiabatic and dynamic stability, as well as high $B_{min}$ coupling, between the individual wires.

It is an object of this invention, therefore, to provide an improved superconductor that overcomes the fabrication problems of the prior art.

SUMMARY OF THE INVENTION

This invention provides an improved method for fabricating a multifilamentary superconductor wire to be utilized in multiplicity. More particularly, this invention provides an intermetalic insulator around a multifilamentary, matrix stabilized superconductor wire, and a method of making the same. In one embodiment, this invention provides a specific intermetalic layer. Also, a system is provided that converts at least a portion of this intermetalic layer into an insulator. Additionally, this invention provides a heat sink around multifilamentary superconductor wires. In another aspect, a method is provided for diffusing and/or heat treating materials, such as titanium, in a matrix, to provide a desired solution in multifilamentary superconductor wires and desired resistivity of the matrix itself. In still another, aspect, this invention provides an improved braided superconductor for pulsed and constant currents for producing strong magnetic fields. With the proper steps and materials, as described in more detail hereinafter, the desired superconductors and coils are provided.

The above and further novel features and objects of this invention will become apparent from the following detailed description of several embodiments of the method and article of this invention when read in connection with the accompanying drawing, and the novel features will be particularly pointed out in the appended claims.

BRIEF DESCRIPTION OF THE DRAWINGS

In the drawings where like elements are referenced alike:

FIG. 5 is a photomicrograph of example 42A in FIG. 8, which is a braided conductor having a 2.7 inch pitch and a 0.150 inch width;

DESCRIPTION OF THE PREFERRED EMBODIMENT:

This invention finds use in magnets for producing high strength magnetic fields. As such, this invention is particularly useful in receiving and transporting charged particles along endless or longitudinally extending equilibrium axes. To this end the method and apparatus of this invention are useful in providing bending and/or focusing magnets for single stage, multi-stage or piggy-back type accelerators, storage rings or colliding, beam facilities, where it is advantageous to provide uniform, variable, pulsed, flat-topped or constant strength magnetic fields having a wide variety of field strengths, field shapes, repetition rates, and locations. However, this invention also has a wide utility in conducting a wide variety of pulsed or constant currents having a wide variety of amplitudes and wave forms over a wide variety of distance or in a large variety of circuits, such as are found in transmission lines or any other of a wide variety of applications requiring the transmission of dc or ac electricity or the production of magnetic fields. For example, this invention is useful for any of the applications in which the braided multifilamentary superconductor described in the above-mentioned co-pending U.S. Patent applications are useful, and/or in motor windings, such as in high dc torque motors at low r.p.m. For ease of explanation, the method and apparatus of this invention are described in relation to an embodiment for producing a braided multifilamentary superconductor, but as understood in more detail hereinafter by one skilled in the art, other utilities, applications, and apparatus than those mentioned above are provided by this invention, comprising but not limited to the superconductor apparatus mentioned in the October 1971 issue of the Scientific American.

In understanding this invention, it is known from the above-identified patents that various transition and non-transition elements can be combined to form the so-called hard or type II superconductors that are advantageously employed for conducting large currents and/or for producing strong magnetic fields up to relatively high transistion temperatures. Examples of these hard superconductors are the inter-metallic compounds of niobium and tin ($Nb_3 Sn$), and vanadium and gallium ($V_3 Ga$), although the metallic alloys of niobium-zirconium (Nb-Zr) and niobium-titanium (Nb-Ti) may also be used. Advantageously, Nb-Ti is used in accordance with this invention, since, as described in the October 1971 issue of the Scientific American, the niobium in the alloy of Nb-Ti has five valence electrons per atoms, and the titanium has four valence electrons per atom, which, since this comes close to the 4.7 valence electrons required for the maximum transition temperature, leads to the proposition that Nb-Ti will become the "work-horse" in the field of superconducting magnets.

Figure 1:
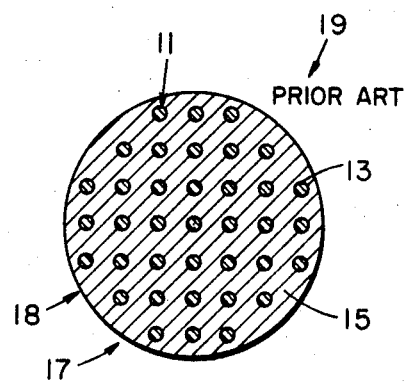
FIG. 1 is a typical partial cross-section through a multifilamentary superconductor wire, such as is known in the prior art.
Figure 2:
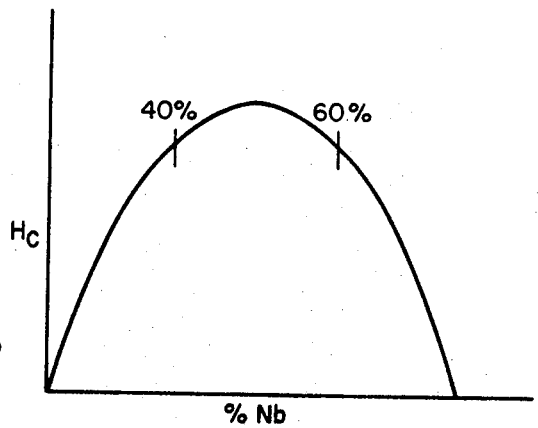
FIG. 2 is a graphic illustration of the percent of Nb vs the upper critical field in the superconductor filaments of FIG. 1.

Heretofore, it has advantageous to assemble hard superconductors 11 as fine superconducting filaments 13 in a normal resistance metal matrix 15 to form a multifilamentary wire 17, as shown in FIG. 1. Moreover, the percentages of the chemical elements forming the filaments 13 that have been required heretofore have been in a small range. For example, as shown in FIG. 2, the required variation of the Nb in the hard superconductor 11 has had to be in the range of from only about 40 percent to about 60 percent, and preferably has been about 50 percent, whereby in the case of a Nb-Ti superconductor 11, the chemical elements thereof have been required in the proportions of close to 50 percent Nb and 50 percent Ti in wire 17. Additionally, these multifilamentary wires 17 have been assembled together in multiplicity, e.g., to form a cable 18 of many twisted composites 19. Thus, as will be understood in the art, difficulties have been encountered heretofore in constructing the required supercondutors 11, filaments 13, matrix 15, wires 17, composites 19, cables 18, and/or in constructing magnets therefrom having braided wires 17 or composites 19, particularly for conducting large or pulsed currents and/or for producing strong magnetic fields.

These fabrication difficulties have been particularly acute, since the mentioned hard superconductors have been brittle. Accordingly, in one method of fabrication, the drawing of various starting materials is advantageously employed for the production of suitable filaments 13, wires 17 and composites 19. In this regard, a plurality of malleable single component Nb rods is placed in a copper cylinder containing titanium and drawn through a series of decreasing diameter dies to produce a multifilamentary wire having a plurality of fine Nb filaments disposed in a copper matrix containg titanium. Heat treating then converts the single component filaments into the Nb-Ti multicomponent hard superconductors mentioned above by diffusion of the titanium from the matrix into filaments 13. The composite 19 advantageously is formed by twisting a plurality of wires 17 into a composite 19 having an O.D. of about 8 mils and filaments 13 having a diameter of about 3 mils, which are used for providing a braided superconductor for winding a high strength magnet, as will be understood in more detail hereinafter. In this regard, a suitable cryostat, such as well known in the art, cools the filaments 13 in the magnet to below their superconducting transition temperature. One suitable cryostat is illustrated in the above-mentioned Sampson et al. applicaton.

Figure 3:
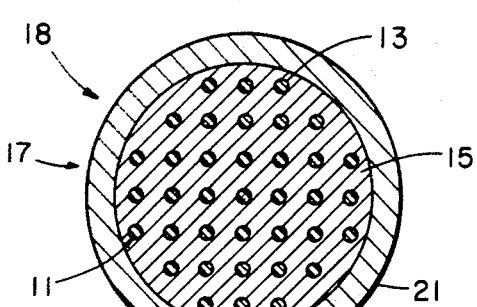
FIG. 3 is a partial cross-section of one embodiment of the wire of FIG. 1 having a resistive envelope thereon that is made from a tin (Sn) eutectic coating in accordance with one embodiment of the method of this invention.

In the method of this invention, which employs the above-described Nb-Ti hard superconductor 11 in the form of fine filaments 13 in a normal resistance metal matrix 15 forming a multifilamentary wire 17, an electrically resistive envelope 21 is produced on the outside of the described wire 17, as shown in FIG. 3. Advantageously, this envelope 21 is produced by running the described wire 17 of FIG. 1 across rotating wheels and through a molten bath of a liquid tin (Sn) eutectic, such as 96 percent tin and 4 percent silver, at a selectively variable rate sufficient to coat the wire 17 with a coat of tin for reducing the ratio of copper to superconductor to a preselected optimum value.

Figure 4:
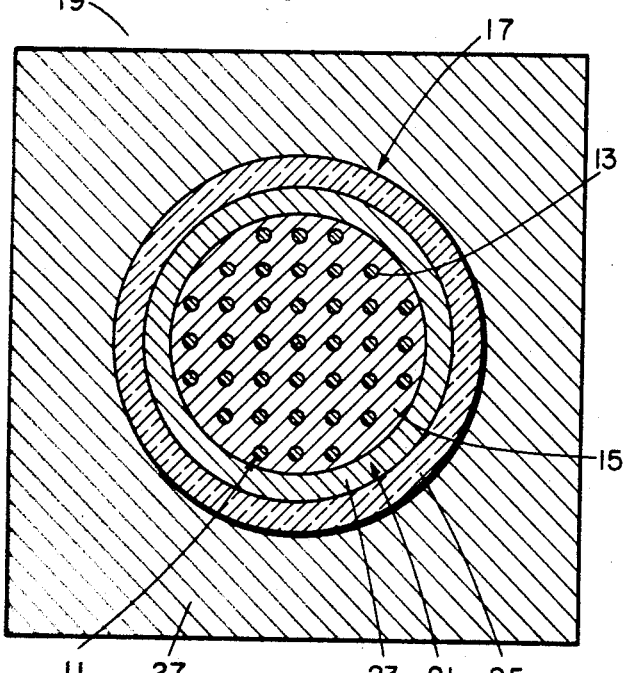
FIG. 4 is a partial cross-section of one embodiment of the multifilamentary composite structure and article of this invention that results from the use of the wire of FIG. 3 as a core in accordance with a further embodiment of the method of this invention.
Figure 6:
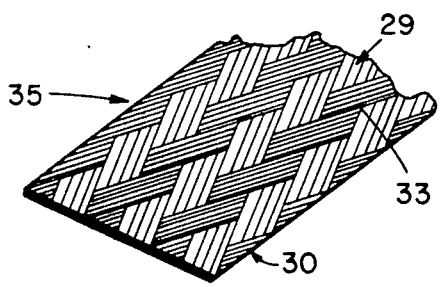
FIG. 6 is a partial three-dimensional view of a braided superconductor made from the assembly of FIG. 4 in accordance with another embodiment of this invention.
Figure 7:
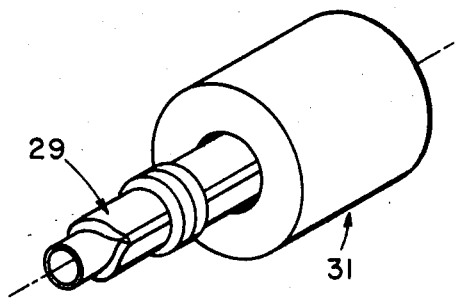
FIG. 7 is a partial three dimensional view of a magnet made from the braided superconductor of FIG. 6 in accordance with a still further embodiment of this invention.
Figure 5:
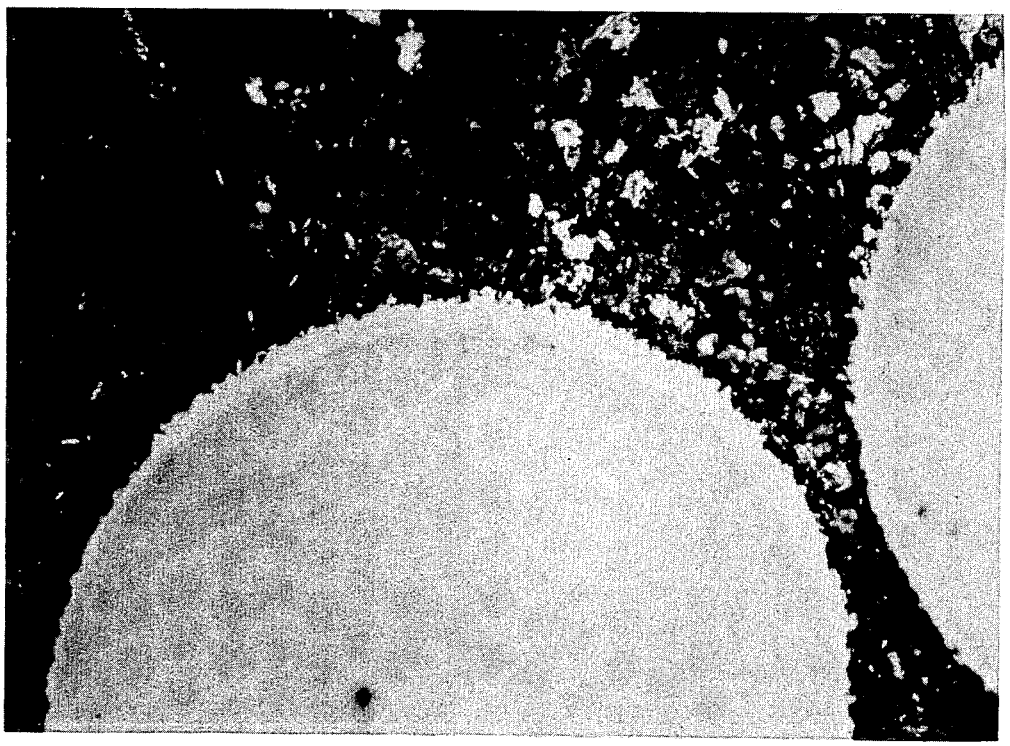
FIG. 5 is a photo-micrograph of the multifilamentary composite of FIG. 4.
Figure 8:
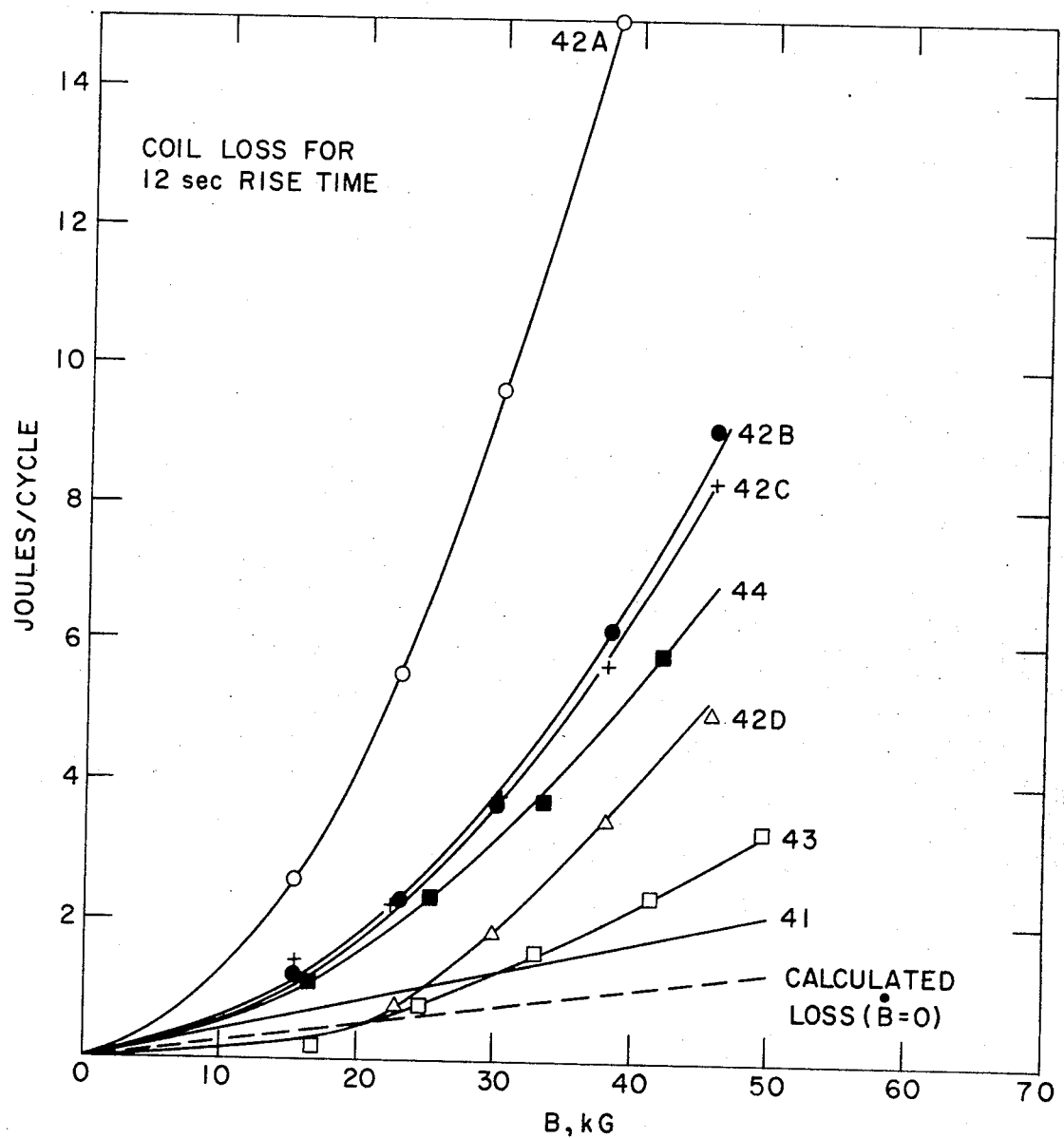
FIG. 8 is a graphic illustration of loss/cycle vs B kilgauss for a fixed period of a braid having various thickness of insulation around the individual conductor itself, where 42A – 42B represent coils in which only one parameter is changed i.e., where successively longer heat treatment results in thin but progressively thicker insulation; in this regard.

To this end, the tin coat joins with copper from matrix 15 on the outside of wire 17 to form a residual layer of a tin-bronze alloy 23 that provides the envelope 21 on the outside of the wire 17. For example, the tin coated wire 17 is heat treated for a time and at a temperature sufficient to form the alloy 23 and to diffuse it into the matrix 15 sufficiently to form an envelope 21 having an electrical resistivity on the outside of the wire 17 higher than the resistance of the matrix 15 that the envelope surrounds. Thereafter, in accordance with this invention, when the wire 17 having the envelope 21 thereon is potted in a heat sink, such as an Indium, Thallium heat sink as described in more detail hereinafter, and heat treated to form an insulator 25 on the outside of envelope 21 as shown in FIG. 4, the time constant for the coupling currents between the wires 17 is low. Advantageously, the wire of FIG. 4, which is shown in FIG. 5, is braided as shown in FIG. 6 and wound into a magnet, as shown in FIG. 7. One example of the steps, sequence method for and producing the wire 17, envelope 21 and insulator 25 of the embodiment of FIG. 4 which is also illustrated in FIGS. 8 and 5 is provided in the following Example I:

Example I

42 A - Indium Thallium heat sink (illustrated in FIG. 8)
1. silver-tin coat Ti-Nb multifilament composite shown in FIG. 1 to form composite shown in FIG. 3;
2. this is braided;
3. then the braid is heat treated (to raise critical current of braid) at 350° C for 150 hours under pressurized inert atmosphere; (range depends on Nb content — which determines heat treatment temperature and time)(In this example Nb and Ti are equal-about 50 percent each); This causes the tin coating to diffuse into the copper matrix 15, and gives a high tin-bronze envelope 21, which is highly resistive and is used later in the process.
4. Braid is filled with Indium-Thallium solder fill at very high melt temp. from 25° C – 50° C above solder-fill melting point to provide a minimum fill and a good adherence by thermal cleaning due to agitation. To demonstrate the high heat capacity of example 42A of FIGS. 8 and 5, and reasonable thermal conduction, 42A was able to withstand for short periods heat loads in excess of 3 – 10 times higher heat loads and give the same performance as other metallic insulated braid, or organically insulated braid, as illustrated by examples 43 and 41 respectively (FIG. 8).

5. 42A - braid is heat treated with the indium-thallium fill therein an inert atmosphere (slightly pressurized) at 300° C for 17 - 25 hours to form the inner metallic insulation layer 25, which is shown in FIG. 4 and the photomicrograph of FIG. 5. This insulation layer 25, which surrounds tin-bronze layer 23 shown in FIG. 3, decreases losses, as shown in FIG. 8 by examples due to lengthening the time at the heat treatment temperature of 300° C. This layer 25 comprises tin and thallium as major constituents, and copper, titanium and indium as minor constituents in trace amounts.

The coupling of the described multifilament wires in a composite 19 in accordance with this invention, for example in a braid, such as described in the above-mentioned co-pending application or in a nonbraided cable-conductor, such as will be understood in the art, may be analyzed by suitable theoretical expressions.

The critical pitch length is given by $$L_c^2 = 2\alpha^{1/2} (D/d + D) J_c \rho d/B_a \quad (1)$$

where $\alpha$ is the fraction of the material occupied by the superconducting filaments 13 and the matrix 15 between them and the rest of the wire 17, $D$ is the spacing of wires 17 in a composite 19, $d$ is the diameter of wires 17, $J_c$ is the critical current density, ** is the resistivity of the matrix 15 plus a filler forming a heat sink, e.g., SnAg solder or In (T1), and B is the rate of magnetic field change.

The pitch of the wires 17 in a composite 19 forming a non-braided conductor or a braided conductor is limited by the efficient use of the wire 17 (too short a pitch and the effective $J_c$ of the conductor decreases); D and $\alpha$ are fixed by the maximization of the stable current density. Therefore, the only effective means of increasing $B_a$ for a given pitch is to increase $\rho$ of the matrix plus filler, i.e., the resistivity of the matrix plus the filler.

It is known in the art that for small $\omega$ (slow cycles), the average loss per unit length of the conductor is given by:

$$P/L = [B_o (D-d) L\omega/\pi]^2/\rho_e \quad (2)$$

where $$\rho_e \approx (D-d) \rho$$

or the loss/cycle is proportional to $\omega$. At the other end of the frequency spectrum, for large $\omega$ (very fast cycles), the loss/unit length is given by $$P/L = [(\pi/L) (K_3/K_1) \cos\ ]^2 \rho_e/16 \quad (3)$$

$K_3 = B_0(D-d)/\rho_3$, $K_1 = (1/\rho_e)(\mu_o/\pi) \log ((2D-d)/d)$ or the loss per cycle will decrease with increasing frequency.

With regard to desired stability of a wire 17, such as illustrated in FIGS. 4, 5, 8, and 9 in a composite 19, which will be understood from the above, this stabilization can be classified under the following three headings in Table I:

TABLE I

1. Cryogenic stabilization which in essence is the provision of an alternate path in matrix 15 for the current to shunt the superconductor filament 13;
2. Enthalpy stabilization, which is the heat capacity and/or energy stored in the individual superconductor filament 17 and its surroundings, comprising matrix 15, envelope 21, ceramic insulator 25, and indium-thallium heat sink 27 around a plurality of wires 17, as shown in FIG. 4;
3. Dynamic stabilization, which is obtained by the presence of enough low or intermediate resistance material in matrix 15, envelope 21, ceramic insulator 25, and indium-thallium heat sink 27 to impede the flux flow, thus damping magnetic instability that might exist.

Figure 9:
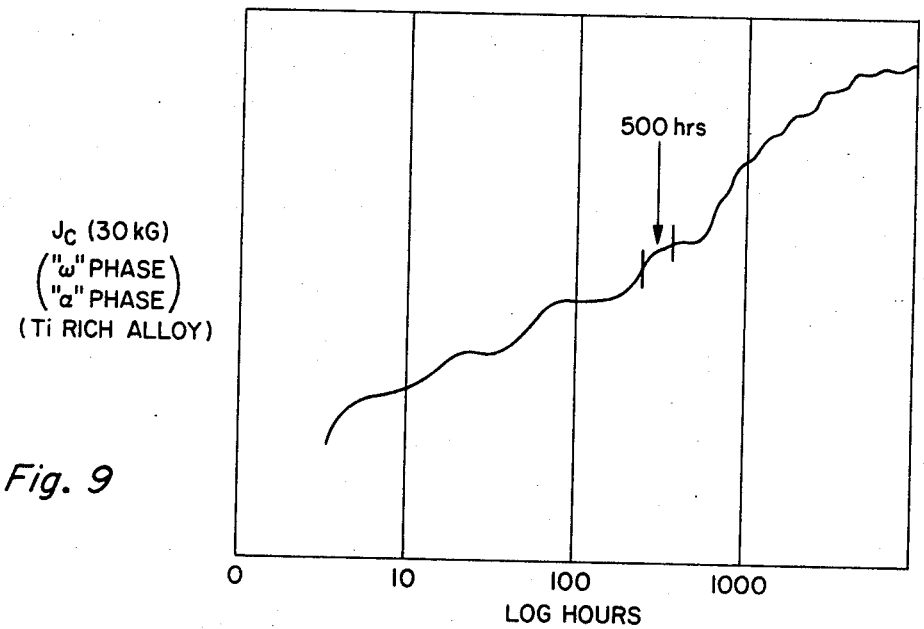
FIG. 9 is a graphic illustration of another example of the heat treating method of FIG. 8 for producing the thin insulator of FIG. 5.

As will be understood from the above, wires of FIG. 3 are assembled to form the geometric configuration of FIG. 4, which is a partial illustration of the assembly of FIG. 5 in accordance with this invention. To this end, the method and heat treating steps of this invention have the advantage of compatibly providing together in one superconductor system, two separate sets of characteristics that are obtained together during the same heat treatment. One set of characteristics involves a raising of the critical current in the superconductor filaments 13 at a given field. In this regard, FIG. 2 illustrates the importance of the requirement of suitable proportions of Ti and Nb, and to this end the proper "$\omega$" and "$\alpha$" phases are provided in an initially Ti rich alloy by suitably extending the time of the heat treatment which can be up to from 50 hours to between a minimum heat treating time of 100 hours and a maximum heat treating time of 1,000 hours, as shown in FIG. 9. The other of the above-mentioned set of characteristics provided by this invention in the mentioned heat treating sequence, involves the metalurgical insulation of the individual composite wires 17 in a matrix 15 stabilized composite 19 having an envelope 21 and a ceramic insulator 25 in an indium containing heat sink 27 to increase the electrical resistance between the adjacent composite wires 17. Moreover, the above is provided while maintaining good thermal conduction in a particular geometric configuration, such as in the braid of FIG. 6 and/or in the magnet of FIG. 7, as described in more detail hereinafter, i.e., this invention minimizes the thermal barrier between the adjacent composite wires 17 and the matrix 15. Additionally, as will be understood by one skilled in the art, this invention maximizes the stability of the described and shown superconductor systems of FIGS. 5 and 4 in the geometric configurations of FIGS. 6 and 7 wherein these systems comprise a plurality of composite wires 17 in a matrix 15 having envelopes 21, insulators 25 and a heat sink 27 in a magnetic field to provide maximum mechanical, electrical and thermal stability while conducting steady state or rapidly pulsed currents at high current densities and high magnetic strengths.

It will be understood that one form of stabilization is provided by providing the embodiments of FIGS. 5 and 4 in a braid, such as the braid 29 shown in FIG. 6 that is made by braiding many wires 17, although composites 19 can be substituted for the wires 17, in which case the composite is formed by twisting together many wires 17. This provides the high overall current density that is required in a syncrotron dipole, such as the dipole 31 shown in FIG. 7, which is made from ribbons 30 of braid 29, as understood in the art. This form of stabilization is achieved, since the forminae 33 formed by ribbons 30 of braid 29 provides circulation of a cryogenic cooling fluid 35, such as liquid helium, in, around and through the ribbons 30.

The necessity of small diameter filaments 13 for the losses to be below a few watts per meter on a magnet pulsing cycle of 10 sec. is more stringent than that of flux jump stability required by enthalpy (adiabatic) criterion. The adiabatic criteria for this flux jump stability (i.e., the second form of stabilization, these flux jumps being described in detail in the March 1967 Scientific American, pp 115 et seq.), may be expressed as an upper limit on the size of filament 13, as follows:

$$d \leq \pi (3\xi C_p T_o/2\mu_0)^{1/2}/J_c \quad (4)$$

for NbTi d 40 $\mu$, where $\xi$ density, $T_o = J_c ( \quad J_c/$ 18T) $T_c /2$, and $C_p$ is the specific heat. The size of the multifilament composite 19 is limited by the maximum stable field at the surface of the superconductor filaments 13

$$B_m \leq 2 (\xi\mu_0 C_p T_o)^{1/2} \quad (5)$$

The third type of stabilization, namely dynamic stability, has heretofore involved formulas derived for a strip conductor, where the flux damping is to be localized, e.g., braid 29 with multifilament wires 17 and intermetallic filler 35:

$$J^2 W^2 \leq C T_o (D_t / D_m)^{1/2}/2\pi ; \quad (6)$$

$C$ = specific heat, $W$ = width of braid 29, $D$ = diffusivity

The pertinent data of the wires 17 used in various conductors of the magnet dipole 31 or other magnets, are presented in the following Table II:

TABLE II

Properties of Superconducting Multifilament Wires
(Diameter = 0.008 in. unless noted)

| Manu-facturer | Wire Type | Core Number | Percent SC | Insulation | A dc at 40 kG 10-11 Ω-cm Ic | | R $\frac{293°K}{10°K}$ |
|---|---|---|---|---|---|---|---|
| Aircon | 1 | 121 | 25 | Formvar | 13.5 | 16.3 | 68 |
| | 2 | 121 | 33 | Formvar | 21.0 | 23.6 | 68 |
| | 3 | 361 | 45 | Formvar | 24.2 | 24.4 | 75 |
| | 4 | 361 | 45 | AgSn | 24.2 | 24.4 | 75 |
| Cryomag | 5* | 211 | 44 | Formvar | 25.0 | 32.0 | 37 |
| | 6 | 210 | 44 | AgSn | 16.0 | 23.0 | 31 |
| | 6a | 210 | 44 | SnCu | 23.0 | 28.0 | 31 |
| | 6b | 210 | 44 | SnCu | 23.0 | 25.0 | 31 |
| Supercon | 7 | 403 | 50 | Formvar | 19.2 | 21.2 | 24 |
| | 8 | 403 | 50 | AgSn | 19.2 | 21.2 | 24 |

*8.8 mil wire

The conductors 6a and 6b had the described envelope 21 thereon, which was provided by the above-described metallurgical process for obtaining higher performance in a braid 29 in accordance with this invention.

In the operation of a small solenoid made from the described envelope encased wire 17, tests were made on a solenoid magnet having the following parameters: i.d., = 2.5 cm, o.d. 7.5 cm to 10 cm, length = 4.5 cm, n3000 m of wire 17 from Table II in a fully transposed 33 strand flat braid 29, magnetic field range 30–60 kG. The results are tabulated in the following Table III:

| Magnet Number | Wire Type | Coil Potted | Organic Insulation | I/I_c dc | Pulsed |
|---|---|---|---|---|---|
| 19 | 1 | No | Yes | 1.0 | 1.0 |
| 19 | 1 | Yes | Yes | 1.0 | 1.0 |
| 23 | 7 | No | Yes | 0.6–0.9 | |
| 23 | 7 | Yes | Yes | 0.8–0.9 | 0.7 |
| 24 | 5 | No | Yes | 0.6–0.8 | |
| 24 | 5 | Yes | Yes | 0.7–0.9 | 0.6 |
| 28 | 3 | Yes | Yes | 0.7–0.8 | 0.7–0.8 |
| 33 | 2 | No | Yes | 0.9 | 0.8 |
| 33 | 2 | Yes | Yes | 0.7–0.9 | 0.6–0.9 |
| 30 | 4 | Yes | No | 1.0 | 0.5 |
| 31 | 4 | No | Yes | 1.0 | 1.0 |
| 32 | 4 | No | No | 1.0 | 0.5–0.6 |
| 42 | 6a | No | No | 1.0 | 1.01 |
| 42a* | 6b | No | No | 1.0 | 0.8 |
| 42b | 6b | No | No | 1.0 | 1.1 |
| 42c | 6c | No | No | 1.0 | 1.1 |

*Cooling restricted on one side with Teflon tape.

Figure 10:
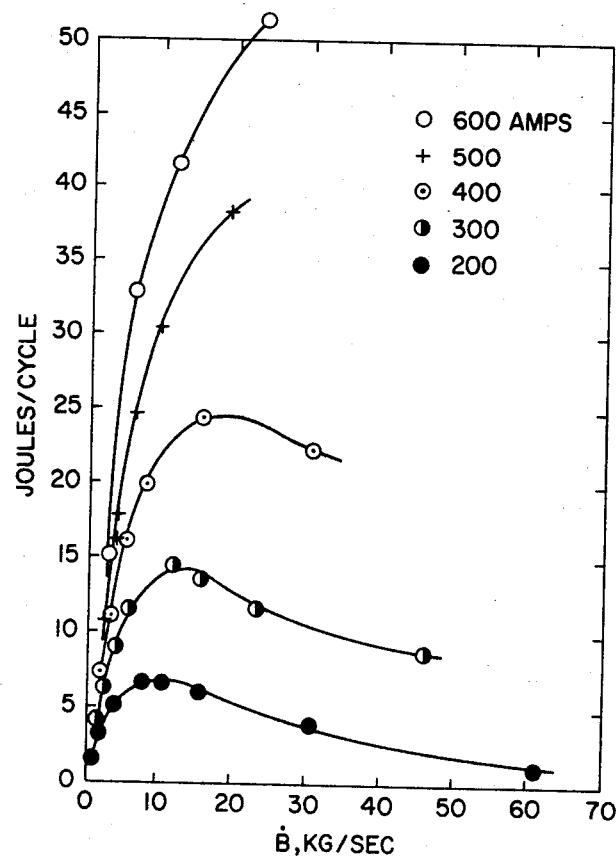
FIG. 10 is a graphic illustration of losses/cycle for one coil made with braided superconductors.

In an arbitrarily insulated braid 29, there exists various degrees of coupling, just as the same is present in multifilament composites 19 of twisted wires 17. If the braid is coupled to any degree < 20 percent of the totally coupled case, the currents crossing the high resistivity layers dominate the magnet loss and indeed lead to the very high losses illustrated in FIG. 10, which gives the loss/cycle for coil No. 42 in the form of parametric curves of B vs B. It will be seen that the loss/cycle in the low B region increases with frequency, as mentioned above. Although this coils had high losses that actually exceed 20 W at one point, the coil still pulsed to the dc performance limit thereof due to its tightly arranged series coils and an adequate cooling in a cryogenic cooling fluid.

In accordance with the described wire 17 of this invention, an intermetallic insulation 25 formed around envelope 21 in heat sink 27, reduces the coupling between the wires 17 in braid 29 or in a composite 19 made up of twisted wires 17. Moreover, these insulated wires 17 have had a 100 percent record for reproducibility and a maximum training of ≤ 2 percent. Also, potting in the indium-thalium heat sink 27, provides a low loss/cycle vs field strength, which clearly provides the advantage that this invention tends to decrease heretofore known adverse effects of conductor motion of the wires 17, either in a braid 29 or a non-braided composite 19, under the influence of conducting pulsed currents in the filaments 13 of the superconductor 11 thereof. In this regard, the dipole magnet 31 of FIG. 7 has had strenuous force restrictions (3000+ A/-turn at 40 kG not of a hoop stress nature), particularly in comparison to the $\pi$ windings of a solenoid, but the potting forming heat sink 27 in accordance with this invention provides better stability than the heretofore known Formvar brand epoxy potted dipole coil magnets, which suffered from degradation due to coil motion.

In regard to the above described embodiments of this invention having an envelope 21 around wires 17, and having the same disposed on the outside of wires 17 beneath a ceramic insulator 25, while the latter is disposed inside a heat sink 27, it is advantageous to diffuse Ti to provide the above-described proportions of Ti and Nb in the superconductor 11 of wires 17. To this end, this diffusion is accomplished by the above-described heating steps.

In tests of coils consisting of 132 8-mil composites 19 of wires 17 having an envelope 21 and insulation 25 thereon, and potted in an indium-thalium heat sink 27 in a braid 29 1.6 cm wide on a 12.5 cm. i.d. formed with an o.d. of 2.5 cm., the data for $\pi$ windings, wherein the current vs field characteristics thereof corresponds to those of the dipole 31 of FIG. 7, is provided in the following Table IV:

TABLE IV

Details of Large $\pi$'s

| Magnet Numbers | Wire Type | Coil Potted | $I/I_c$ dc |
|---|---|---|---|
| 1$\pi$ | 1 | No | 1.0 |
| 2$\pi$ | 7 | No | 0.5–0.8 |
| 2$\pi$ | 7 | Yes | 0.6–0.8 |
| 3$\pi$ | 7 | Yes | 0.4–0.6 |
| 4$\pi$* | 5 | No | 0.5–0.7 |
| 4$\pi$* | 5 | Yes | 0.6–0.8 |
| 5$\pi$ | 3 | No | 0.4–0.6 |
| 5$\pi$ | 3 | Yes | 0.5 |
| 6$\pi$ | 8 | No | 0.9–1.0 |
| 7$\pi$ | 6 | No | 1.0 |
| 7$\pi$ | 6 | Yes | 0.5–0.8 |

*110 strand braid

Details of the prototype sychrotron magnets 31 made with wires 17 having an envelope 21 and insulator 25 in a braid 29 in a heat sink 27, are given in the following Table V.

TABLE V

| Magnet Number | Wire Type | Coil Potted | Iron Shield | $I/I_c$ dc |
|---|---|---|---|---|
| 22* | 5 | No | No | 0.4–0.5 |
| 25 | 7 | Yes | No | 0.3 |
| 25 | 7 | Yes | Yes | 0.4 |
| 26 | 1 | No | No | 0.7–0.9 |
| 26 | 1 | Yes | Yes | 0.8 |
| 27 | 6 | No | No | 0.9 |
| 27 | 6 | No | Yes | 1.0 |

*110 strand braid

In regard to the above, it is clear that the dipole 31 for the two-stage, piggy-back, cold magnet sychrotron described in BNL 15430 does not require a high B < 10 kG/sec. Moreover, the metal and intermetallic envelopes 21 and insulators 25 on the wires 17 of this invention, offer a stable and reliable system, as well as enhanced performance per unit volume of superconductor 11.

In review of the above, this invention has the advantage of compatibly providing together in one superconductor system two separate sets of characteristics that are obtained together during heat treatment. One set of characteristics involves a raising of the critical current in the superconductor at a given field. The other set of characteristics involves the metallurigcal insulation of individual composite superconductor wires to increase the electrical resistance betwen adjacent, matrix stabilized composite superconductor wires. Moreover, the above is provided while maintaining good thermal conduction in the system, i.e., minimizing the thermal barrier between the composite wires and the matrix thereof. Additionally, this invention maximizes the stability of a particular superconductor, which comprises a plurality of composites in a matrix in a given geometry in a magnetic field, to provide maximum mechanical, electrical and thermal stability, for steady state or rapidly pulsed currents at high current densities and high magnetic field strengths.

This invention has the advantage of providing an improved method for making improved superconductors by providing an intermetallic resistive envelope around a multifilamentary matrix stabilized superconductor wire. Also, an insulator is provided around the resistive envelope, which has a higher resistance than the matrix, which in turn has a higher resistance than the superconductor. Additionally means are provided for producing the desired superconductor, e.g., by diffusing titanium from or into the matrix.

It is understood from the above that while indium-thallium has been described as the heat sink solder-fill material, other soft solders may alternately be used, such as silver-tin, tin-bismuth and possibly indium.

It is also understood, that while conditions have been given for the above examples, other conditions are contemplated for other examples of this invention. For example, heat treating at 650° C for 500 hours can be used for the diffusion process that produces the described Nb-Ti filaments 13. Also, the superconductor of this invention can comprise in one example, 8 mil diameter wires 17 having 50 percent Ti 50 percent Nb filaments 13 that are 3 mils in diameter. In this and the other examples, the heat sink 27 may be specifically 10 percent thallium filled into ribbons of braid cleaned with muric acid. In this regard, heating to 300° C opens the foraminae of the ribbons. Likewise the bronze envelope 21 can be formed at 300° C in a 17–30 hour time interval before, after or during the diffusion that produces the Nb-Ti filaments 13.

What is claimed is:

1. A superconductor, comprising a Nb-Ti superconductor filament in a copper containing matrix having a tin-bronze envelope around said matrix having an electrical resistance higher than that of said matrix.

2. The superconductor of claim 1, having an insulator around said envelope.

3. The superconductor of claim 2, having an indium-thallium heat sink around said insulator.

4. The superconductor of claim 3 which is assembled into a multifilamentary matrix stabilized superconductor having a diameter of about 8 mils and superconducting filaments of about 50 percent Nb and about 50 percent titanium about 3 mils in diameter in a copper containing matrix.

5. The superconductor of claim 4 in which said superconducting filaments contain titanium diffused from said matrix.

6. The superconductor of claim 3 in which said superconductor is assembled into a braid forming foraminae having indium-thallium heat sink material, comprising 10 percent thallium at least partially filling the foraminae of said braid.

7. The superconductor of claim 1 in which said tin-bronze envelope contains tin diffused into a portion of said matrix.

* * * * *